US012644802B2

(12) United States Patent
Bormans et al.

(10) Patent No.: US 12,644,802 B2
(45) Date of Patent: Jun. 2, 2026

(54) METHOD AND APPARATUS FOR PREPARING SAMPLES UNDER CRYOGENIC CONDITIONS FOR IMAGING OR DIFFRACTION EXPERIMENTS IN AN ELECTRON MICROSCOPE

(71) Applicant: Bormans Beheer B.V., Eindhoven (NL)

(72) Inventors: Bernardus Jacobus Marie Bormans, Eindhoven (NL); Ronald Arthur Marx, Veldhoven (NL)

(73) Assignee: Bormans Beheer B.V., Eindhoven (NL)

( * ) Notice: Subject to any disclaimer, the term of this patent is extended or adjusted under 35 U.S.C. 154(b) by 1004 days.

(21) Appl. No.: 17/745,332

(22) Filed: May 16, 2022

(65) Prior Publication Data

US 2022/0381656 A1    Dec. 1, 2022

(30) Foreign Application Priority Data

May 26, 2021    (NL) ...................................... 2028288

(51) Int. Cl.
*G01N 1/30*        (2006.01)
*G01N 1/31*        (2006.01)
*G01N 1/42*        (2006.01)

(52) U.S. Cl.
CPC .............. *G01N 1/30* (2013.01); *G01N 1/312* (2013.01); *G01N 1/42* (2013.01)

(58) Field of Classification Search
CPC ............. G01N 1/30; G01N 1/312; G01N 1/42
See application file for complete search history.

(56) References Cited

U.S. PATENT DOCUMENTS

| | | | |
|---|---|---|---|
| 9,865,428 B2 | 1/2018 | Remigy | |
| 2009/0186405 A1* | 7/2009 | Chin | A01N 1/145 435/307.1 |

(Continued)

FOREIGN PATENT DOCUMENTS

| | | |
|---|---|---|
| EP | 1803141 A1 | 7/2007 |
| EP | 2381236 A1 | 10/2011 |
| EP | 3475681 A1 | 5/2019 |

OTHER PUBLICATIONS

Kasas, S. , "Vitrification of cryoelectron microscopy specimens revealed by high-speed photographic imaging", Journal of Microscopy, vol. 211, Pt 1, 2003, 48-53.

(Continued)

*Primary Examiner* — Nicole M Ippolito

(74) *Attorney, Agent, or Firm* — Peacock Law P.C.; Justin R. Muehlmeyer; Daniel Berenger-Russell

(57)    ABSTRACT

A method and apparatus for preparing samples for imaging under cryogenic conditions or diffraction experiments under cryogenic conditions in an electron microscope. One version of the method involves: partially submerging a flat sample carrier with sample material vertically into a reservoir containing a cryogenic liquid until all areas with sample material are positioned below the surface of the cryogenic liquid; vitrifying the sample material at least one stream of cryogenic liquid to each considerable side of the sample material on the flat sample carrier at or directly below the surface of the cryogenic liquid in the reservoir; and fully submerging the flat sample carrier with the vitrified sample material into the cryogenic liquid to cool the flat sample carrier to a temperature below about 136 K. Variations of the method and various features of the apparatus are described.

16 Claims, 6 Drawing Sheets

(56)         References Cited

U.S. PATENT DOCUMENTS

| 2020/0363301 A1 * | 11/2020 | McQueen | .............. G01Q 30/18 |
| 2022/0316784 A1 * | 10/2022 | Kuijper | ................ F25D 29/001 |

OTHER PUBLICATIONS

Passmore, Lori A., et al., "Specimen preparation for high-resolution cryo-EM", Methods Enzymol., vol. 579, 2016, 51-86.

Ravelli, Raimond B.G., et al., "Cryo-EM structures from sub-nl volumes using pin-printing and jet vitrification", Nature Communications, vol. 11, No. 2563, 2020, 1-9.

* cited by examiner

1

METHOD AND APPARATUS FOR PREPARING SAMPLES UNDER CRYOGENIC CONDITIONS FOR IMAGING OR DIFFRACTION EXPERIMENTS IN AN ELECTRON MICROSCOPE

CROSS-REFERENCE TO RELATED APPLICATIONS

This application claims priority to and the benefit of Netherland Patent Application No. 2028288, titled "METHOD AND APPARATUS FOR PREPARING SAMPLES UNDER CRYOGENIC CONDITIONS FOR IMAGING OR DIFFRACTION EXPERIMENTS IN AN ELECTRON MICROSCOPE", filed on May 26, 2021, and the specification and claims thereof are incorporated herein by reference.

BACKGROUND OF THE INVENTION

Field of the Invention

The invention is directed to a method of preparing samples under cryogenic conditions for imaging or diffraction experiments under cryogenic conditions in an electron microscope.

Samples can be, (single) particles of macromolecular compounds for imaging in a transmission electron microscope (TEM) or during diffraction experiments. Diffraction experiments are, for example, inspection by monochromatic charged particles or ionizing radiation under cryogenic conditions.

The samples can be prepared by a method comprising three steps. In a first step the sample material is dissolved in water to form an aqueous solution or dispersion. In a second step the aqueous solution or dispersion containing the sample material is applied to a TEM sample carrier. A TEM sample carrier comprises a support, in particular a grid, covered by a thin foil. After the second step, the sample carrier comprises one or more areas of a thin film of aqueous solution or dispersion comprising the sample material on a thin foil on a support. In a third step the areas with aqueous solution or dispersion containing the sample material are vitrified by (partially) submerging the sample carrier in a reservoir containing a cryogenic liquid or by rapid cooling of sample material by 'spraying' with a cryogenic liquid.

The sample carrier comprises typically a standard TEM grid, that is a copper support grid with a diameter of approximately 3.05 mm and 30 μm thickness, but may be of different make (constitution and dimensions). The sample carrier also comprises typically a thin carbon (or other material) foil, that is transparent to the electron beam of the TEM, to fill the gaps between the grid meshes.

In a transmission electron microscope sample material is inspected by using an electron beam in an Ultra-High Vacuum environment. A TEM comprises an electron source generating a beam of electrons, typically with an energy of, for example, between 60 and 300 keV. Deflectors and lenses then manipulate the beam so that it irradiates the sample material. The sample material is typically a thin sample of e.g. a biological material, or a semiconductor material with a thickness sufficiently small that it shows transparency to the electrons. To that end thicknesses between, for example, 30 nm (for samples comprising many high-Z atoms, such as semiconductor material or metallic sample materials) and 200 nm (for biological sample materials) are routinely used, although samples as thick as, for example, 1 μm may be used.

The beam, while passing through the sample material, interacts with the sample material. Some electrons pass through the sample material unhindered, some electrons are scattered by the sample material while generating X-ray quanta and some electrons are absorbed by the sample material. The electrons passing through the sample material are then used to form, for example, an image (enlarged by a projector lens system) on a sensor, such as a fluorescent screen. The fluorescent screen may be part of a camera system using a CCD sensor or a CMOS sensor. However, it is also known to form the image directly on a CMOS or CCD sensor. Such sensors are typically capable to image 4000× 4000 pixels. Also other methods of gaining information are known, such as forming an Electron Energy Loss Spectrum or an Energy Dispersive X-ray map of the sample material, or a diffraction pattern giving crystallographic information.

When inspecting biological sample material by an electron beam, damage occurs during inspection. This damage is partly caused by localized heating and partly by damaging the chemical bonds in the sample material. The effects of this damage are much smaller at cryogenic temperatures than at room temperature. Therefore, biological sample materials are preferably inspected in a cryo-TEM, where sample material can be observed at cryogenic temperatures. Cryogenic is in this context a temperature below the glass transition temperature of ice where amorphous ice is stable; a temperature of 136 K or less. The need for this temperature is that otherwise the formation of ice crystals will damage the biological cells or tissues. The sample vitrification process will also prevent de-hydration of 'wet' biological sample materials when placed inside the vacuum of a TEM sample chamber.

It is noted that cryo-microscopes operating at a sample temperature of liquid nitrogen or even liquid helium are commercially available. To avoid damage to the sample material prior to inspection, crystallization of ice in the biological cells or tissue must be avoided. This is realized by freezing the sample material extremely fast to a temperature below 136 K, so that vitrified ice (also named amorphous ice) forms instead of crystalline ice.

Background Art

Several methods of preparing sample materials under cryogenic conditions for imaging or diffraction experiments in an electron microscope are known in the art.

A first approach for cryogenic preparation of sample materials is by plunging a sample carrier into a cryogenic liquid after the application of the sample material.

EP 2 381 236 A1 relates to an apparatus for preparing a cryogenic TEM specimen on a specimen carrier, the apparatus comprising a plunger, blotters, a container for holding a cryogenic liquid, the plunger moving the specimen carrier to an applicator position for applying a liquid, blotting the specimen carrier, and plunging the specimen carrier in the cryogenic liquid. The apparatus is characterized in that it shows a first acceptor for holding a first storage capsule equipped to store one or more specimen carriers, the plunger is equipped with a gripper for gripping the specimen carrier; a second acceptor for holding a second storage capsule at a cryogenic temperature to store one or more specimen carriers at a cryogenic temperature; and the apparatus is equipped to move the specimen carrier automatically from the first storage capsule via the applicator position and the blotting position to the second storage capsule.

S. Kasas et al. "Vitrification of cryoelectron microscopy specimens revealed by high-speed photographic imaging", Journal of Microscopy, Vol. 211, Issue 1, July 2003, pp. 48-53, contains a detailed analysis of the mechanism of sample vitrification through plunge freezing of sample grids.

The document of Kasas et al. is mentioned in col. 3 of U.S. Pat. No. 9,865,428.

Plunging of a sample in a cryogenic liquid is shown in FIG. 1B that describes the prior art. According to FIG. 1B in U.S. Pat. No. 9,865,428 the sample S is vitrified using a 'vertical plunging' technique instead of a 'horizontal plunging' approach (see FIG. 1A of U.S. Pat. No. 9,865,428). Vertical plunging is considered to produce unsatisfactory results, because the sample S is cooled 'linearly' (in vertical direction) rather than 'face on' (see col. 9, U.S. Pat. No. 9,865,428). During vertical plunging there is no direct contact between the cryogenic liquid and the sample, because of a gap that forms next to both planar sides of the sample carrier below the surface of the cryogenic liquid when the sample carrier is plunged. The sample on the sample carrier is thus cooled in an indirect way by cooling the grid from the circumference to the centre. This is shown by FIG. 7 in the article of Kasas, mentioned hereabove. During this method ice crystals are formed on the vitreous layer. These ice crystals can damage the sample.

The sample depicted in FIG. 2A of U.S. Pat. No. 9,865,428 is the result of 'horizontal plunging' and does not show, when imaged using cryo-TEM at relatively low magnification, a largely homogeneous/featureless image. Instead, it is speckled with dark, dot-like features. These are surficial islands of ice that have formed on the side of the film facing upward (away from the cryogen surface) during plunging. The presence of these features obscures the study of samples that share a common line-of sight and causes unwanted scattering effects in a charged-particle beam used to study the sample.

A second approach for cryogenic preparation of sample material is by rapid cooling of sample material by 'spraying' with a cryogenic liquid after the application of the sample material to a sample carrier.

U.S. Pat. No. 9,865,428 discloses a method of preparing a sample for study in a charged-particle microscope, whereby the sample is subjected to rapid cooling using a cryogen, comprising the following steps:

Providing two conduits for transporting cryogenic fluid, each of which conduits opens out into a mouthpiece, which mouthpieces are arranged to face each other across an intervening gap;

Placing the sample in said gap;

Pumping cryogenic fluid through said conduits so as to concurrently flush from said mouthpieces, thereby suddenly immersing the sample in cryogenic fluid from two opposite sides.

A disadvantage of the 'spraying' method according to U.S. Pat. No. 9,865,428 is that the environment of the sample at the start of cooling with the cryogenic fluid is air that requires a significant amount of humidity to prevent evaporation of the thin aqueous sample layer. This humid air is then cooled together with the sample and the sample carrier and will deposit some amount of crystalline ice on the vitrified sample. As explained above ice crystals are to be avoided in the production of high quality cryo electron microscopy samples.

EP3475681B1 describes a method of and apparatus for preparing a sample for imaging or diffraction experiments under cryogenic conditions, comprising the steps of: applying a sample to a sample carrier, such as a film on a support, in particular a grid comprising such a film on a support; removing residual medium, typically liquid, from an incubated sample on a film on a support; vitrifying the sample on the carrier. The sample is vitrified in less than 5 ms by directing a jet of liquid coolant to the centre of the film and onto the sample. After vitrification of the sample the complete sample carrier is cooled to cryogenic temperatures to prevent re-heating of the vitrified sample. Next the sample plus carrier is stored in a cryogenic fluid until imaging.

The sample cooling rate according to EP3475681B1 is fast enough to produce vitrified ice, however a disadvantage of this method is that not the whole sample and the sample holder are cooled instantaneously. In the time period of 200-300 ms between starting the jetting of the liquid coolant and the moment when the complete sample carrier is at cryogenic temperature partial thawing of the sample might occur. This can produce crystalline ice in the vitreous layer that may damage the macromolecular compounds in the sample.

Discussion of the above publications herein is given for more complete background and is not to be construed as an admission that such publications are prior art for patentability determination purposes.

BRIEF SUMMARY OF THE INVENTION

The inventors of the method according to the invention found that the methods described in the prior art do not show satisfactory results in preparing vitrified sample materials for electron microscopy applications. In particular the inclusion of crystalline ice in the vitreous sample layer will damage the biological structures. Furthermore, the ice crystals will scatter the electron beam and significantly degrade the image quality.

It is an object of the present invention to provide an improved method of and apparatus for preparing samples under cryogenic conditions for imaging or diffraction experiments under cryogenic conditions in an electron microscope that do not show the disadvantages mentioned hereabove.

To this end, embodiments of the present invention are directed to a method comprising the steps of:

a. applying sample material to at least one area of at least one considerable side of a flat sample carrier having two considerable sides, b. partially submerging the flat sample carrier with the sample material vertically into a reservoir containing a cryogenic liquid until all areas with sample material are positioned below the surface of the cryogenic liquid, c. vitrifying the sample material by directing, from a level at or directly below the surface of the cryogenic liquid, at least one stream of cryogenic liquid to each considerable side of the sample material on the flat sample carrier at or directly below the surface of the cryogenic liquid in the reservoir and d. fully submerging the flat sample carrier with the vitrified sample material into the cryogenic liquid to cool the flat sample carrier to a temperature below 136 K.

The method according to the invention has the advantage that the stream of cryogenic liquid will 'push' the humid air away from the environment of the sample material and replace it by cryogenic liquid.

A further advantage is that the time needed for vitrifying the sample material and cooling down the sample carrier, is shorter compared to the methods described in the prior art. This shorter time will reduce the amount of crystalline ice that can be formed inside the vitreous layer. Consequently, a better representation of the original sample material in the cryo-electron microscope image is obtained.

In another embodiment of the method according to the invention, the method includes preparing samples under cryogenic conditions for imaging or diffraction experiments under cryogenic conditions in an electron microscope.

Sample materials can be, (single) particles of macromolecular compounds. The sample materials are applied to at least one area of at least one considerable side of a flat sample carrier having two considerable sides for imaging in a transmission electron microscope or during diffraction experiments. Sample materials can, for example, be biological samples, such as proteins, viruses, cells, cell components, single-cellular organisms, bacteria, nanoparticles and crystals.

Before vitrification the sample material is applied as a thin aqueous layer to at least one area of at least one considerable side of a flat sample carrier having two considerable sides.

The sample material is applied on a flat sample carrier. The term 'flat' means that the sample carrier has a thin shape. In two dimensions the sample carrier can have any shape; for example a rectangle, a triangle or a circle. However, the third dimension is of a much smaller size than the other two dimensions.

The flat sample carrier has two considerable sides. On at least one area of one or two of the considerable sides the sample material can be applied.

The flat sample carrier is in particular a grid comprising a thin foil between the meshes. The grid is typically a standard TEM grid; a copper support grid with a diameter of approximately 3.05 mm and 30 µm thickness, but may be of different make (constitution and dimensions). The thin foil between the meshes is, in contrast to the grid, transparent to the electron beam of the TEM. It is made of, for example, a carbon foil, a Formvar foil or a combination of a Formvar foil with carbon or silicon monoxide. In a specific embodiment, called AutoGrid® a sturdy ring is added around the 3 mm copper grid to facilitate sample transfer by automated grippers without damaging the grid and the sample material.

In EP3475681B1 it is described how a sample material is applied to the flat sample carrier by bringing the sample particles in an aqueous solution or dispersion and then putting a drop of the solution or dispersion on the thin foil. In an embodiment, the sample material is applied to, e.g. printed onto, the sample carrier by means of a capillary or a pin. This method, called pin printing, has the advantage over other known methods of sample deposition that both the location of the sample material on the carrier surface as well as the width and thickness of the aqueous film with sample material can be controlled. During pin printing the sample material is applied to the at least one area of at least one considerable side of a flat sample carrier by an applicator (e.g. a solid pin) that is positioned close to that area(s) of the flat sample carrier such that a capillary bridge of sample material in water is created between pin and the at least one area of at least one considerable side of the flat sample carrier. The applicator will then move over the at least one area of at least one considerable side of the flat sample carrier to create a film of sample material in water with a thickness of 10-2,000 nm, preferable with a thickness of 30-200 nm.

In an embodiment of the present invention, a reservoir, e.g. a pipette, is provided to supply the pin or capillary with sample material in water. For example, a droplet or meniscus is temporarily expelled from the reservoir, sample material in water is taken from the drop or meniscus by means of the pin or capillary, once or repeatedly until sufficient sample material in water has been applied to the at least one area of at least one considerable side of the flat sample carrier or carriers, and the droplet or meniscus is withdrawn into the reservoir. The reservoir containing the sample material in water can be stored for future use.

The sample material in water is preferably applied by pin printing as pin printing reduces sample waste by depositing only a sub-nanoliter volume of sample material in water on the at least one area of at least one considerable side of the flat sample carrier. Preferably, only the amount of sample material in water that will be vitrified is deposited on specific area(s) of the flat sample carrier so no blotting of excess sample material in water from the carrier surface is needed. This will significantly increase the control over the thickness of the layer of sample material in water in the period between deposition of the sample material in water and vitrification.

Alternatively, the flat sample carrier can be made from semiconductor material (e.g. Si, $SiO_2$, SiN, etc.) using MEMS technology (see, for example, EP1803141B1). A flat sample carrier made by MEMS technology is a square, for example of 5 by 10 mm, and contains windows that are 10-50 nm thick. The MEMS technology allows the integration of a temperature sensor on a suspended membrane.

The aqueous solution or suspension containing the sample material is applied to the thin foil in between the meshes (for a grid) or to the windows (for a semiconductor carrier) in the sample carrier in a layer with a thickness of 10-2,000 nm, preferably with a thickness of 30-200 nm.

A flat sample carrier can contain several sample materials on at least one considerable side. When applied to the flat sample carrier by pin printing more than one pattern of the solution in water containing different types of sample material can be deposited.

In another embodiment of the present invention, before applying the sample material, the flat sample carrier is exposed to a plasma. The plasma will discharge the flat sample carrier rendering the flat sample carrier hydrophilic, which in turn facilitates a substantially even application of the sample material to the flat sample carrier. Instead of or in addition to discharge, the plasma cleans the flat sample carrier. It is preferred that the flat sample carrier is subjected to a plasma just prior to applying the sample material to the flat sample carrier, for example less than 15 minutes, preferably less than 10 minutes before applying the sample material to the flat sample carrier In another embodiment of the present invention, that may use one or both of the electrodes needed to generate the plasma described in the previous paragraph, a high DC voltage difference is applied between the capillary or pin on the one hand and the flat sample carrier on the other, creating an electric field driven spray of the sample material towards the flat sample carrier.

In another embodiment of the present invention, at least prior to and preferably also during and after application of the sample material to the flat sample carrier, the temperature of the flat sample carrier is adjusted to a temperature around, at or above the dew point of the gas surrounding the flat sample carrier, preferably to one or more tenths of a degree, e.g. in a range from 0.1 to 1.0 degrees, below or above the dew point temperature of the gas surrounding the flat sample carrier. In an example, the dew point temperature is calculated from temperature and humidity measurements of the gas surrounding the flat sample carrier. The temperature of the flat sample carrier is measured as well. These three measurements are used in a closed feedback loop to control e.g. a Peltier element that thermally contacts the flat sample carrier. Thus, exchange of water, in particular evaporation, between the sample material and the surrounding gas is suppressed or, ideally, prevented and reproducibility is enhanced.

In a further embodiment of the present invention, one or more of the above steps, preferably all steps are carried out in a closed chamber, preferably providing controlled temperature and humidity.

According to step b of the sample preparation process the flat sample carrier, containing the sample material or materials, is partially submerged vertically into a reservoir containing a cryogenic liquid until all areas with sample material are positioned below the surface of the cryogenic liquid.

According to step c of the sample preparation process the sample material is vitrified by directing, from a level at or directly below the surface of the cryogenic liquid, at least one stream of cryogenic liquid to each considerable side of the sample material on the flat sample carrier at or directly below the surface of the cryogenic liquid in the reservoir. This is done for at least the duration that is needed to vitrify the film of sample material in water.

At least one stream of cryogenic liquid is directed to the sample material on each considerable side of the flat sample carrier. In this way the sample material on the flat sample carrier will be vitrified faster.

According to the last step d of the sample preparation process the flat sample carrier with the vitrified sample material is fully submerged into the cryogenic liquid to cool the flat sample carrier to a temperature below 136 K.

A cryogenic liquid is a liquid at cryogenic temperatures, which are temperatures at or below 136 K.

A cryogenic liquid preferably has a temperature in a range from 4-1 K, preferably in a range from 50-135 K, more preferably in a range from 90-125 K. The cryogenic liquid can, for example, be liquid ethane, propane, helium, oxygen, nitrogen and mixtures thereof. Most preferably, the cryogenic liquid is liquid ethane. Liquid ethane can have a temperature of 99 K and gives the highest cooling speed (Ravelli, R. B. G. et al. Automated cryo-EM sample preparation by pin-printing and jet vitrification http://dx.doi.org/10.1101/651208 (2019)).

Since the cryogenic liquid may start to evaporate because of the heat transfer from the sample material and the flat sample carrier the cryogenic liquid can contain an amount of the cryogenic liquid in the gas or vapor phase.

The flat sample carrier containing the sample material or materials is submerged in a vertical position according to the method shown in FIGS. 2A-2C. The flat sample carrier is, according to step b brought below the surface of a cryogenic liquid in the reservoir until all areas with sample material are positioned below the surface of the cryogenic liquid. The sample material will be vitrified, according to step c, by directing, from a level at or directly below the surface of the cryogenic liquid, at least one stream of cryogenic liquid to each considerable side of the sample material on the flat sample carrier at or directly below the surface of the cryogenic liquid in the reservoir.

Preferably, the time between completion of the application of the sample material to at least one area of at least one considerable side of the flat sample carrier and vitrification is less than 1 second, preferably less than 100 ms, more preferably less than 10 ms. According to the present invention the sample materials are vitrified fast because at least one stream of cryogenic liquid is directed to the sample material on each considerable side of the flat sample carrier at or directly below the surface of the cryogenic liquid in the reservoir.

Without being bound to this theory, the inventors are of the opinion that a problem limiting the cooling rate of the plunge freezing method is the creation of a vapor layer at both sides of the flat sample carrier directly after submerging the flat carrier into the cryogenic liquid, see Kasas (mentioned above) FIGS. 7d and 7f. This gaseous layer provides thermal insulation between the sample material on the flat sample carrier and the cryogenic liquid, thereby limiting the cooling rate of the sample material. Most of this gas will be vapor from the cryogenic liquid just above the boiling temperature. In addition, there will also be water vapor that has travelled from the sample deposition chamber (at dewpoint temperature) together with the flat sample carrier to the reservoir with cryogenic liquid. The mixture of vapor from the cryogenic liquid at a temperature just above its boiling temperature and water vapor is very likely to create ice crystals on the sample material. This makes it essential to remove the vapor mixture away from the submerging flat sample carrier as fast as possible so only vitreous ice will be created around the sample material.

In order to quickly remove the cryogenic liquid/water vapor layer in between the sample material and the cryogenic liquid, the method according to the invention will increase the local pressure on the cryogenic liquid around the submerging flat sample carrier to accelerate the upward speed of the (water) molecules in this layer. To this end preferably two nozzles are installed inside the reservoir containing a volume of the cryogenic liquid at or just below the surface of the cryogenic liquid. (see FIG. 2A). Via this nozzle a stream of cryogenic liquid will be directed to the sample material on the flat sample carrier. This will remove the vapor layer that was created around the sample material on the flat sample carrier at the moment the flat sample carrier was submerging into the liquid (see FIG. 2B). The stream of cryogenic liquid only needs to be applied for a very short time (<1 sec) starting at the moment the flat sample carrier hits the surface of the cryogenic liquid during partially submerging the flat sample carrier.

Preferably, at least two nozzles are provided in the reservoir at the surface of the cryogenic liquid or at most 10 mm below the surface of the cryogenic liquid in the reservoir and wherein the nozzles are placed opposite to one another and the streams of cryogenic liquid that leave the nozzles are directed to the sample material on each considerable side of the flat sample carrier.

More preferably, the nozzles are placed at the surface of the cryogenic liquid or at most 8 mm below the surface of the cryogenic liquid, most preferably at the surface of the cryogenic liquid or at most 5 mm below the surface of the cryogenic liquid.

Preferably, the at least two nozzles in the reservoir are facing each other, the flat sample carrier is placed between the nozzles, the streams of cryogenic liquid that leave the nozzles are each directed to the sample material on each considerable side of the flat sample carrier and the distance between each nozzle and the flat sample carrier is at most 5 mm. More preferably, the distance between each nozzle and the flat sample carrier is at most 2 mm, most preferably at most 1 mm.

Preferably, the distance of the first nozzle to the flat sample carrier and the second nozzle to the flat sample carrier is about equal. More preferably, the difference in distance of the first nozzle to the flat sample carrier and the second nozzle to the flat sample carrier is below 0.1 mm.

Preferably, the velocity of the at least one stream of cryogenic liquid is in a range from 1 to 20 m/s, more preferably in a range from 2 to 10 m/s.

Preferably, the combined mass flow rate of the streams is between 10 mL/min to 2 L/min, more preferably 100 mL/min to 1 L/min.

Embodiments of the present invention are also directed to an apparatus for preparing samples for imaging under cryogenic conditions or diffraction experiments under cryogenic conditions in an electron microscope, comprising a flat sample carrier having two considerable sides, a vertically moveable arm with a gripper to hold the sample carrier, an applicator for applying sample material to at least one area of at least one considerable side of the flat sample carrier in the gripper, a reservoir containing a cryogenic liquid and at least two nozzles for streaming cryogenic liquid from a level at or directly below the surface of the cryogenic liquid, to each considerable side of the flat sample carrier in the gripper, when positioned by the vertically moveable arm at or directly below the surface of the cryogenic liquid in the reservoir to vitrify the sample material on the flat sample carrier.

In another embodiment of the present invention, the difference in distance of the first nozzle to the flat sample carrier and the second nozzle to the flat sample carrier is below 0.1 mm.

In another embodiment of the apparatus of the present invention, two nozzles are provided in the reservoir that are facing each other, the flat sample carrier in the gripper is positioned by the movable arm between the nozzles and the distance between each nozzle and a considerable side of the flat sample carrier is at most 5 mm.

In another embodiment of the apparatus of the present invention, the difference in distance of the first nozzle to one considerable side of the flat sample carrier and the second nozzle to one considerable side of the flat sample carrier is below 0.1 mm.

In a further embodiment of the apparatus of the present invention, the moveable arm vertically positions, after vitrification of the sample material, the gripper with the flat sample carrier until the sample carrier is fully submerged in the cryogenic liquid, to cool the flat sample carrier to a temperature below 136 K.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The invention is further explained by the following figures and examples. The accompanying examples are exemplary and explanatory of nature and are not limiting the scope of the invention. To the person skilled in the art, it may be clear that many variants, being obvious or not, may be conceivable falling within the scope of protection, defined by the present claims. The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

DETAILED DESCRIPTION OF THE INVENTION

Figure 1A:
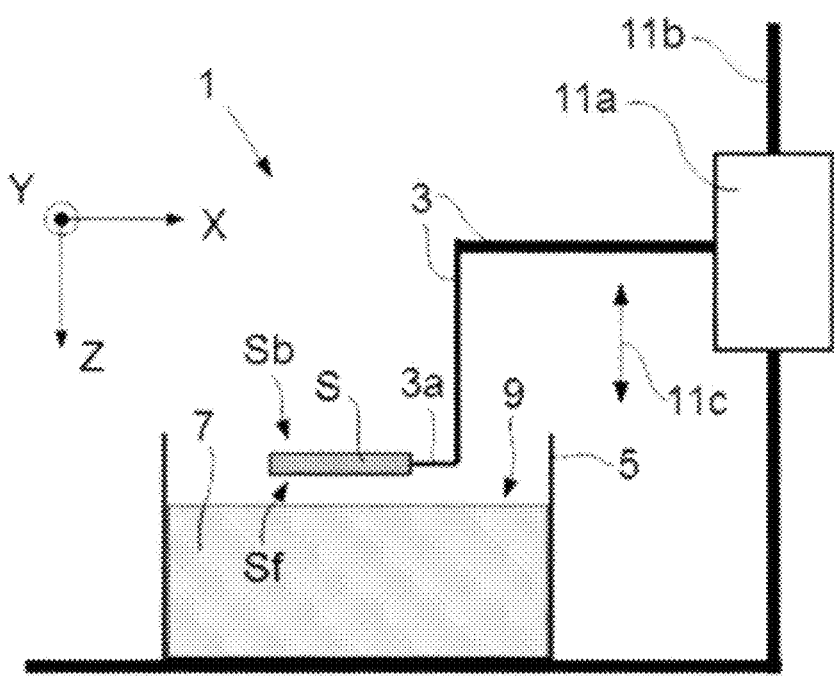
FIG. 1A is a schematic illustration of a horizontal plunging of the flat sample carrier according to the prior art as described in U.S. Pat. No. 9,865,428.
Figure 1B:
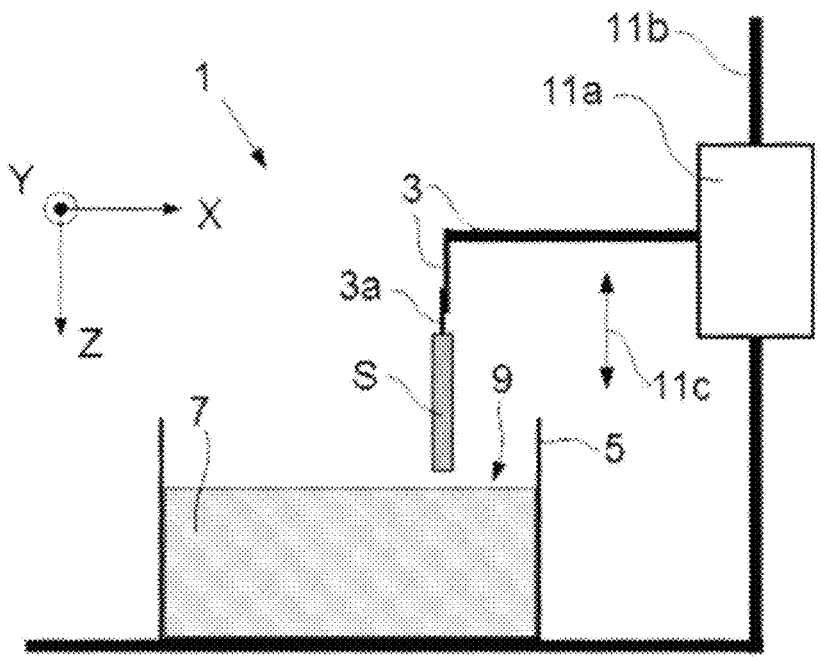
FIG. 1B is a schematic illustration of a vertical plunging of the flat sample carrier according to the prior art as described in U.S. Pat. No. 9,865,428.

In FIGS. 1A and 1B the numbers mean:
XYZ Cartesian coordinate system
S Sample material on flat sample carrier
Sf Frontside of the flat sample carrier
Sb Backside of the flat sample carrier
1 Apparatus
3 Vertically moveable arm
3a Gripper
5 Reservoir for cryogenic liquid
7 Bath of cryogen
9 Cryogenic liquid surface
11a Slider
11b Rod
11c Arrow indicating the movement of slider 11a in Z direction
In FIGS. 2A-2C the numbers mean:
XYZ Cartesian coordinate system
1a Plunger rail
1b Plunger mechanism
1c Vertical plunger movement
2 Vertically moveable arm
2a Sample gripper
S Flat sample carrier
S' Sample material deposited on carrier
3 Reservoir for cryogenic liquid
4 Cryogenic liquid
4a Liquid surface
5 Liquid pump
6a Tube for cryogenic liquid flow to liquid pump
6b Tube for cryogenic liquid flow from liquid pump
6c Tube with cryogenic liquid flow inside reservoir
6d Nozzle at the end of tube 6c to produce a stream of cryogenic liquid
7 Vapor released from cryogenic liquid during sample plunge
In FIGS. 3A-3B the numbers mean:
XYZ Cartesian coordinate system
1a Plunger rail 1b Plunger mechanism
1c Vertical plunger movement
2 Vertically moveable arm
2a Sample gripper
S Flat sample carrier
S' Sample material deposited on carrier
8 Large reservoir for cryogenic liquid
8a Small reservoir for cryogenic liquid inside reservoir 8
9 Cryogenic liquid A
9a Surface of cryogenic liquid A
10 Cryogenic liquid B
10a Surface of cryogenic liquid B
11a Connection to tube 11b
11b Tube for cryogenic liquid flow from reservoir 10 to tube 11c
11c Tube to flow cryogenic liquid from tube 11b, through reservoir 8, into reservoir 8a
11d Nozzle at the end of tube 11c to produce a stream of cryogenic liquid
12 Piston to apply pressure on cryogenic liquid B

EXAMPLES

Sample preparation methods for cryo electron microscopy can be found in Passmore, L. A. & Russo, C. J. Sample Preparation for High-Resolution Cryo-EM. *Methods Enzymol* 579, 51-86 (2016). This also includes a Standard vitrification procedure (Protocol 9, p. 77-79) using the commercially available Vitrobot® plunger (FEI, now Thermo Fisher Scientific).

The invention is further illustrated by the following non-limiting examples.

Comparative Experiment A

Method According to the Prior Art FIG. 1A
FIG. 1A renders a schematic elevational view of aspects of a prior-art apparatus 1 for plunge-cooling sample material on a flat sample carrier S to a cryogenic temperature, more specifically using the "horizontal plunging" technique referred to above. The sample carrier S will typically (but not necessarily) have a composite structure of a type such as that shown in more detail in FIG. 1D of U.S. Pat. No. 9,865,428. Note the Cartesian coordinate system XYZ, which will be used in the following description. The depicted apparatus 1 comprises:

A vertically moveable arm 3 that can be used to grip the flat sample carrier S at/proximal an edge thereof, and retain the flat sample carrier S in a substantially horizontal orientation (parallel to the XY plane). This vertically moveable arm 3 comprises a gripper 3a that grips the flat sample carrier S using, for example, a tweezers action. If desired, the flat sample carrier S may have a small protruding lug (not depicted) that allows it to be more easily gripped by gripper 3a.
A reservoir 5 (such as a Dewar) that can be at least partially filled with a bath of cryogen 7, such that said cryogen 7 has an exposed upper surface 9 (which will be substantially horizontal, apart from relatively small meniscus effects).
A dropping mechanism 11a, 11b that can be used to (at least partially) move the arm 3 into the reservoir 5, allowing a flat sample carrier S in/on (the gripper 3a of) the vertically moveable arm 3 to be plunged below the cryogen surface 9, with a frontside Sf of the flat sample carrier S pointing downward (parallel to the Z direction). As here depicted, the dropping mechanism 11a, 11b comprises a slider 11a that can vertically move up and down along a rod 11b (as indicated by the arrows 11c), parallel to the Z direction. The downward motion of the slider 11a during the plunge may, for example, be free-fall, catapulted or motorized. As an alternative to the depicted mechanism, one could also just manually dip the flat sample carrier S below the cryogen surface 9.

Comparative Experiment B

Method According to the Prior Art FIG. 1B
According to FIG. 1B, the flat sample carrier S is vitrified using a "vertical plunging" technique instead of a "horizontal plunging" approach as described hereabove for FIG. 1A. The method described for FIG. 1A is followed except for the plunging technique.

Example 1

Figure 2A:
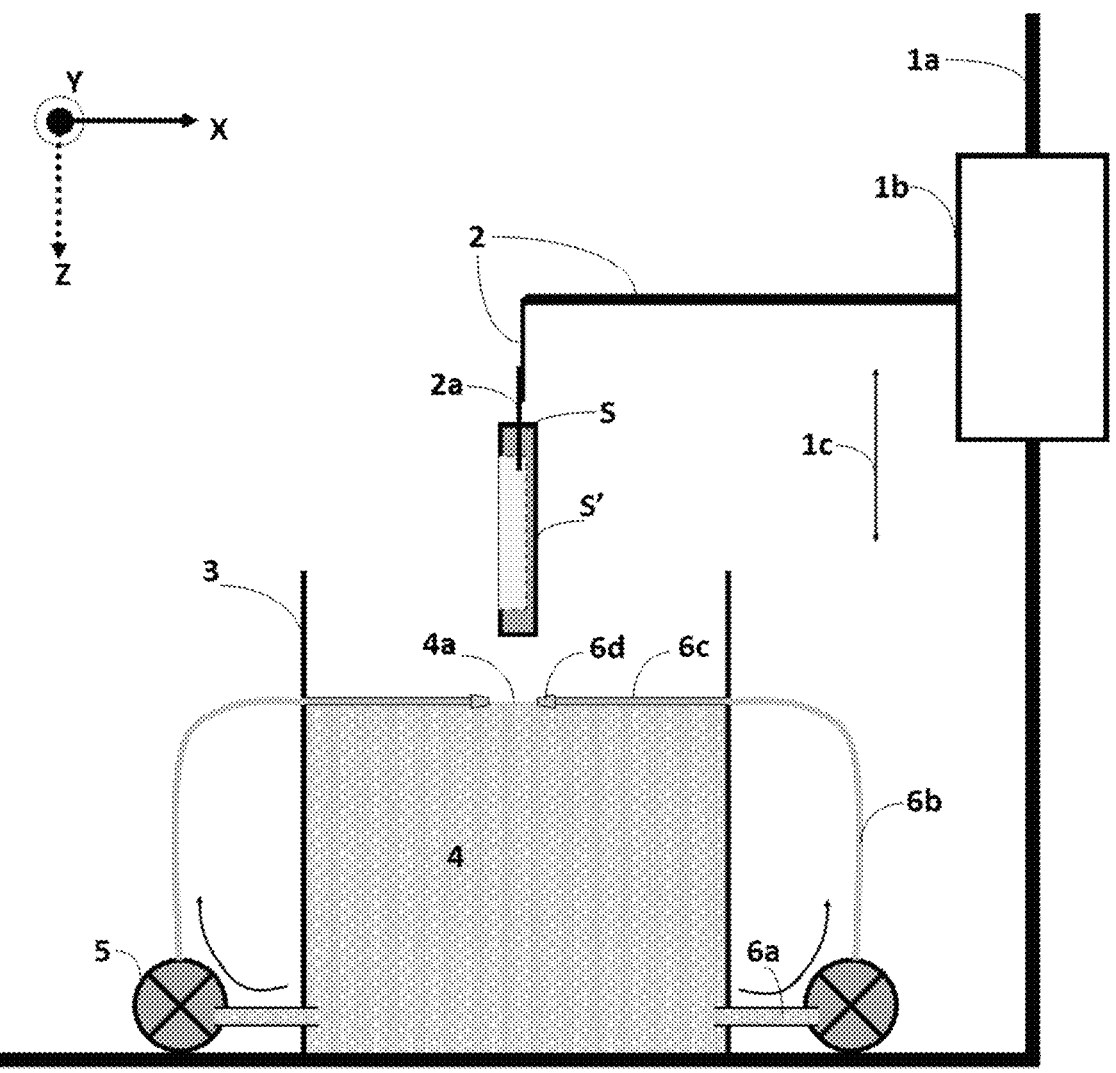
FIG. 2A is a schematic illustration of an apparatus according to the present invention before plunging of the flat sample carrier.
Figure 2B:
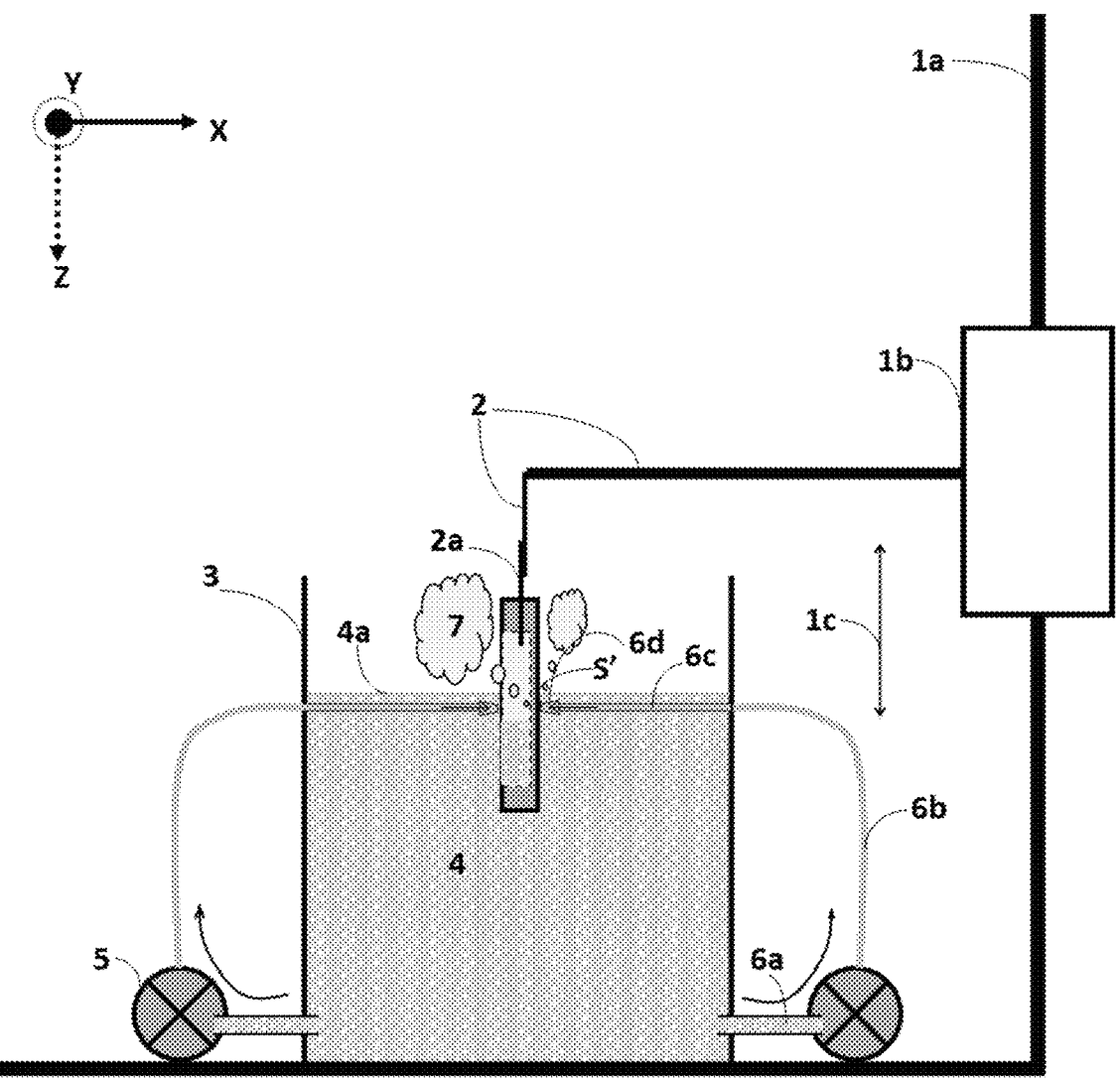
FIG. 2B is a schematic illustration of an apparatus according to the present invention during plunging of the flat sample carrier.
Figure 2C:
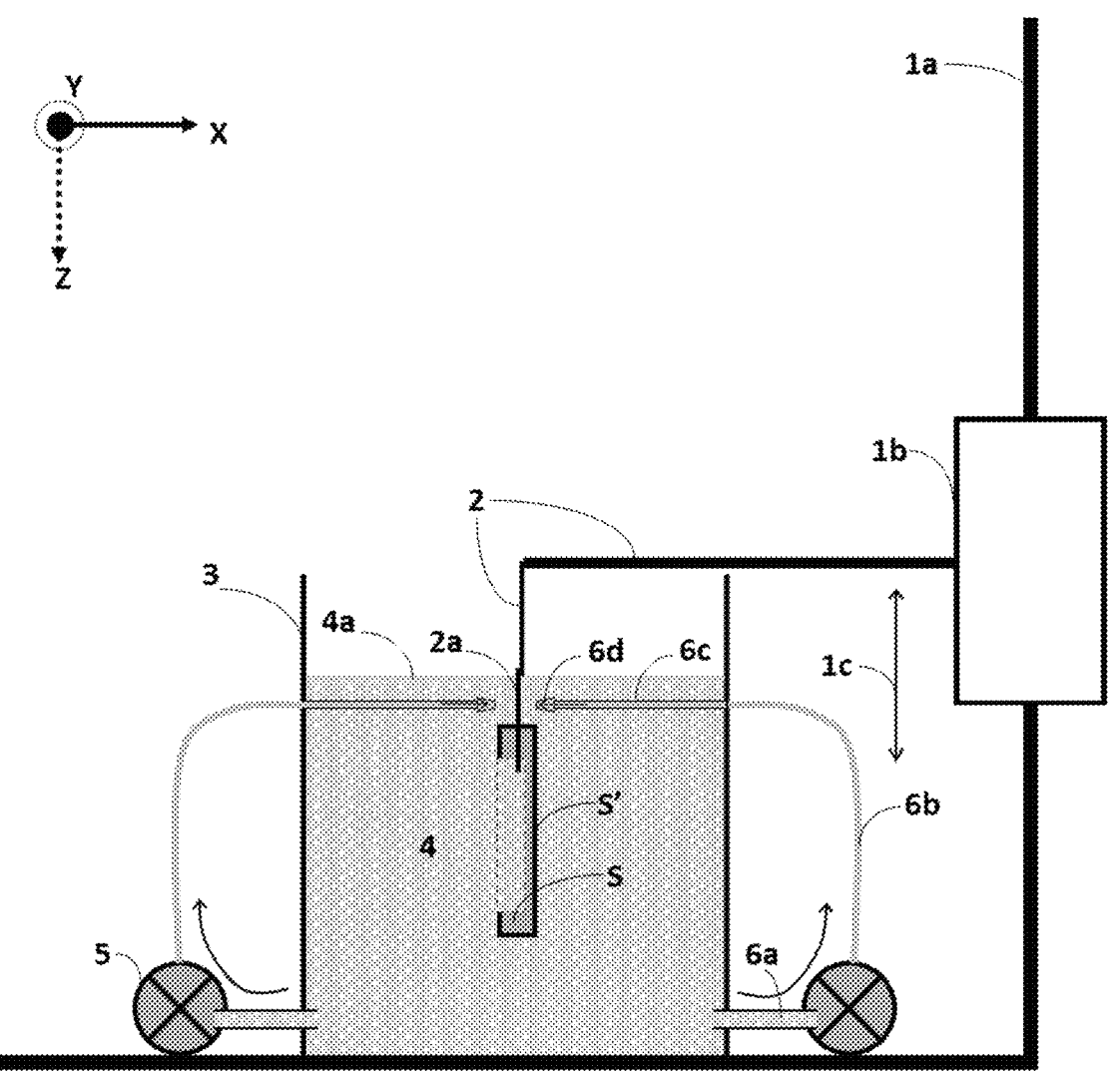
FIG. 2C is a schematic illustration of an apparatus according to the present invention after plunging of the flat sample carrier.

Method According to the Invention; FIG. 2A-2C
A sample material (S') is applied to a flat sample carrier (S) according to the methods described in Passmore et al. mentioned above. The flat sample carrier (S) is attached to the sample gripper (2a) as shown in FIG. 2A. In the apparatus according to the invention as shown in FIG. 2A two tubes for cryogenic liquid (6c) are immersed into cryogenic liquid (4) near the surface (4a) thereof, inside reservoir (3). At the exit of the tubes (6c) two nozzles (6d) are installed opposite to each other with a small gap in between (see FIG. 2A). A pump (5) is used to create a flow of the cryogenic liquid supplied via tube (6a) upwards through tubes (6b) and then inwards through tubes (6c). The plunger mechanism (1b) with an arm (2) and a gripper (2a) is used to hold a sample carrier (S) in a vertical position above the surface (4a) of the liquid coolant inside the gap.
At the start of the sample vitrification process the plunger mechanism will start to move fast downwards (1c) along the plunger rail (1a) using the plunger mechanism (1b) so the flat sample carrier with the sample material (S') will become immersed into the cryogenic liquid. At this time the liquid pump (5) will have started and via the nozzles streams of cryogenic liquid (e.g. ethane at 99K) will be directed to the surface of the submerged sample material (S') on the flat sample carrier (see FIG. 2B) inside the gap. Depending on the flow speed of these streams the increased local pressure of the cryogenic liquid will push upward the vapor layer (7) that formed around the flat sample carrier at the moment it was submerged into the cryogenic liquid. The streams of cryogenic liquid preferably, are applied for a very short time (<1 sec) starting just before the moment the flat sample carrier hits the surface of the cryogenic liquid.
After this very short time the vapor layer around the fully immersed flat sample carrier will have been replaced by the cryogenic liquid (see FIG. 2C). Also the fast downward movement of the plunger stops at the moment the flat sample carrier is fully immersed into the cryogenic liquid.

Example 2

Figure 3A:
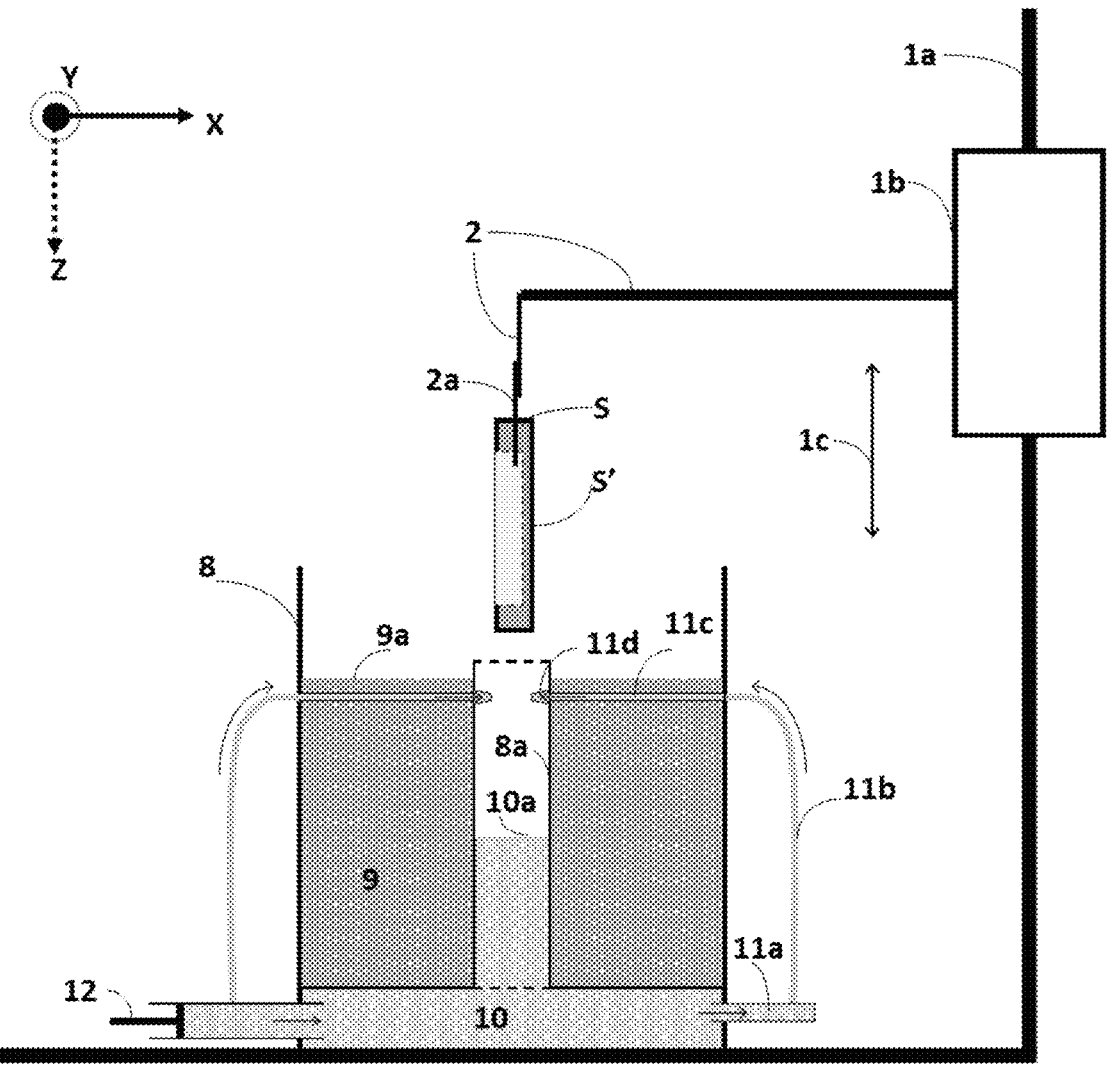
FIG. 3A is a schematic illustration of a second apparatus according to the present invention before plunging of the flat sample carrier.
Figure 3B:
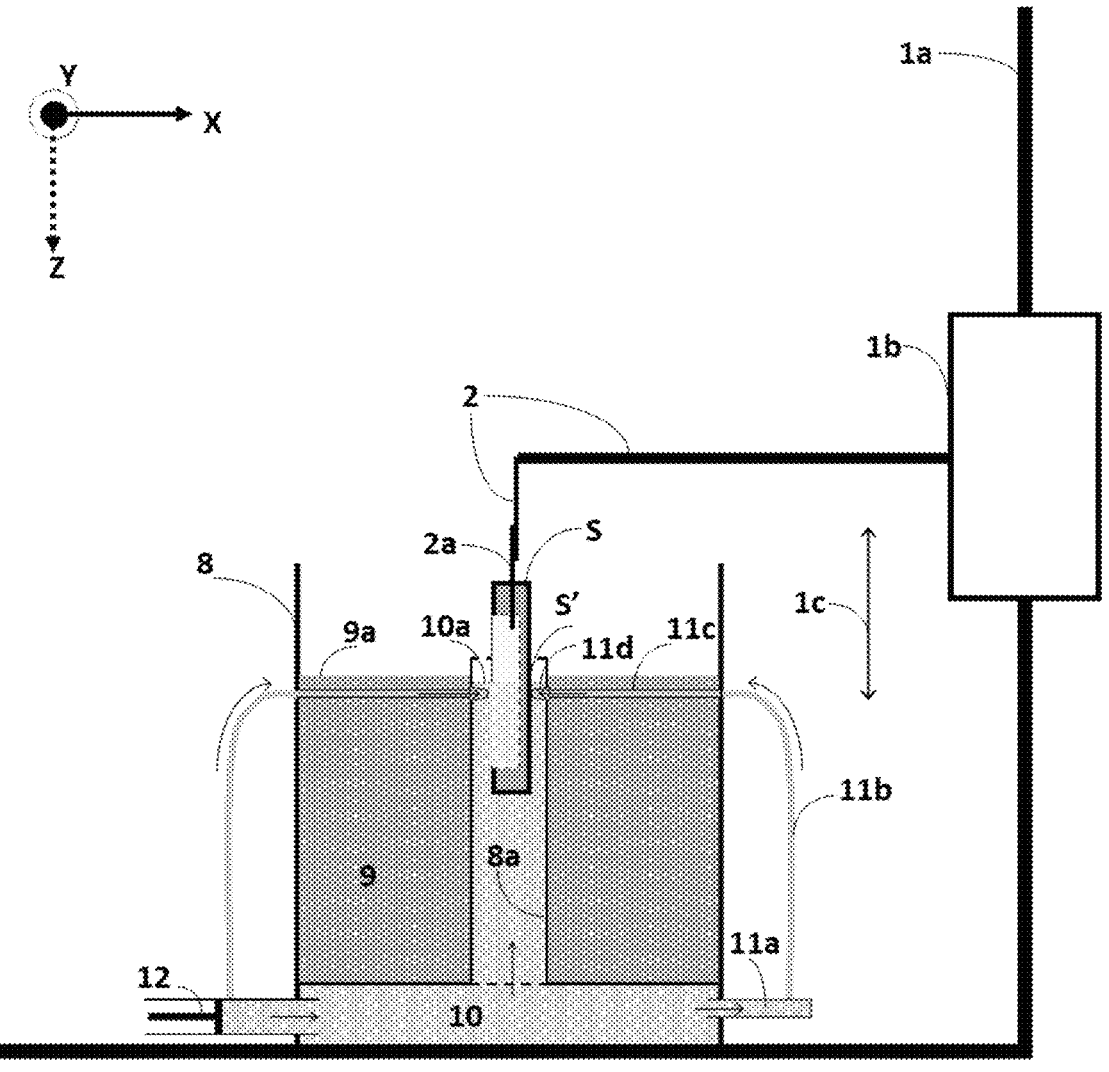
FIG. 3B is a schematic illustration of a second apparatus according to the present invention during plunging of the flat sample carrier.

Method According to the Invention; FIGS. 3A and 3B
A further improvement to the vitrification speed of a sample material (S') can be obtained by using an apparatus according to the invention as shown in FIG. 3A. In this apparatus the two nozzles (11d) that will produce opposing streams of cryogenic liquid are located a small distance (e.g. 2 mm) above the surface layer (10a) of the cryogenic liquid B (10) inside a small reservoir (8a) that is submerged into a larger reservoir (8) of cryogenic liquid A (9) with a boiling point in between the melting point and the boiling point of the cryogenic liquid B (10) inside the smaller reservoir (8*a*) (e.g. propane with a boiling point of 231K and a melting point of 86K inside ethane with a boiling point of 185K). The surface layer of the cryogenic liquid A (9*a*) in the larger reservoir (8) will be a little above the vertical position of the two nozzles (11*d*) so the liquid inside the tubes that are connected to these nozzles will be kept at a low temperature.

At the start of the vitrification process the plunger mechanism (1*b*) lowers the flat sample carrier (S) to a position where the sample material (S') is in between the two nozzles (11*d*) (see FIG. 3B). At the moment the flat sample carrier (S) has arrived at this position the plunger movement (1*c*) is paused and the streams of cryogenic liquid will vitrify the central area of the flat sample carrier (S) from the two opposing nozzles (11*d*). This is achieved by increasing the pressure inside the smaller reservoir (8*a*) by moving piston (12). The pressure increase in the smaller reservoir (8*a*) will at the same time raise the surface level (9*a*) of the cryogenic liquid B, see FIG. 3B. By making the horizontal dimensions of the reservoir (8*a*) at the level of the flat sample carrier (S) as small as possible the gas and vapor inside this reservoir will be pushed upward very fast. As a result sample material (S') will be vitrified faster than about 1 ms that is typically obtained by traditional plunging.

Compared to the situation in FIG. 3A the piston (12) has moved to the right in FIG. 3B. This action has elevated liquid level (10*a*) to just above the level of the nozzles (11*d*).

The immersed part of the flat sample carrier (S), including the deposited sample material (S'), can, in this way, be vitrified within 0.1 ms (depending on the exact made of the flat sample carrier). Vitrification of the sample material according to this method will be completed in about 20 μs at cooling rates>$10^6$ K/s. The half-submerged position of the flat sample carrier between the streams of coolant will allow the vapor that is present around the submerged surfaces of the flat sample carrier to escape upwards more quickly than would be possible in a fully submerged configuration.

Full immersion of the flat sample carrier, by re-starting the movement of the vertically moveable arm (2) downward, will prevent re-heating of the vitrified sample material by the heat that is still present in the upper part of the flat sample carrier (S).

The timing of the different steps for this sample vitrification method using streams and immersion can be modified by changing the synchronisation between the plunging action and the piston action. The timing between starting the streams of cryogenic liquid from nozzles (11*d*) and increasing the liquid level (10*a*) can be modified by changing the diameter of the tubing (11*a*, 11*b* and 11*c*) through which the cryogenic liquid is flowing. Results will depend a.o. on the thickness of the sample material that needs to be vitrified and the temperature of the flat sample carrier.

The preceding examples can be repeated with similar success by substituting the generically or specifically described components and/or operating conditions of embodiments of the present invention for those used in the preceding examples.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited in this application are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another. Note that in the specification and claims, "about" or "approximately" means within twenty percent (20%) of the numerical amount cited.

What is claimed is:

1. A method of preparing samples for imaging under cryogenic conditions or diffraction experiments under cryogenic conditions in an electron microscope, the method comprising the steps of:
    a. applying sample material to at least one area of at least one side of a flat sample carrier having two sides;
    b. partially submerging the flat sample carrier with the sample material vertically into a reservoir containing a cryogenic liquid until all areas with sample material are positioned below the surface of the cryogenic liquid;
    c. vitrifying the sample material by directing, from a level at or directly below the surface of the cryogenic liquid, at least one stream of cryogenic liquid to the sample material on each side of the flat sample carrier at or directly below the surface of the cryogenic liquid in the reservoir; and
    d. fully submerging the flat sample carrier with the vitrified sample material into the cryogenic liquid to cool the flat sample carrier to a temperature below about 136 K.

2. The method according to claim 1, wherein at least two nozzles are provided in the reservoir at the surface of the cryogenic liquid or at most about 10 mm below the surface of the cryogenic liquid in the reservoir and wherein the nozzles are placed opposite to one another and the streams of cryogenic liquid that leave the nozzles are directed to the sample material on each side of the flat sample carrier.

3. The method according to claim 1, wherein two nozzles are provided in the reservoir that are facing each other, the flat sample carrier is placed between the nozzles, the streams of cryogenic liquid that leave the nozzles are each directed to the sample material on one side of the flat sample carrier and the distance between each nozzle and the flat sample carrier is at most about 5 mm.

4. The method according to claim 3, wherein the difference in distance of the first nozzle to the flat sample carrier and the second nozzle to the flat sample carrier is below about 0.1 mm.

5. The method according to claim 1, wherein the time between completion of the application of the sample material to at least one area of at least one side of the flat sample carrier and vitrification is less than about 1 second.

6. The method according to claim 1, wherein the velocity of the at least one stream of cryogenic liquid is in a range from about 1 to about 20 m/s.

7. The method according to claim 1, wherein the combined mass flow rate of the streams is between about 10 mL/min to about 2 L/min.

8. The method according to claim 1, wherein, before applying the sample material, the flat sample carrier is exposed to a plasma.

9. The method according to claim 1, wherein at least prior to the application of the sample material to the flat sample carrier the temperature of the flat sample carrier is adjusted to a temperature at or above the dew point of the gas surrounding the flat sample carrier.

10. The method according to claim 1, wherein the sample is applied to at least one area of at least one side of the flat sample carrier by a pin that is positioned close to at least one area of at least one side of the flat sample carrier such that a capillary bridge of sample material in water is created between the pin and the at least one area of at least one side of the flat sample carrier.

11. The method according to claim 10, wherein a film of sample material in water is created on at least one area of at least one side of the flat sample carrier with a thickness of about 10-2,000 nm.

12. The method according to claim 1, wherein one or more of the above steps, all steps are carried out in a closed chamber.

13. The method according to claim 1, wherein the time between completion of the application of the sample material to at least one area of at least one side of the flat sample carrier and vitrification is less than about 100 ms.

14. The method according to claim 1, wherein the time between completion of the application of the sample material to at least one area of at least one side of the flat sample carrier and vitrification is less than about 10 ms.

15. The method according to claim 1, wherein the velocity of the at least one stream of cryogenic liquid is in a range from about 2 to about 10 m/s.

16. The method according to claim 1, wherein the combined mass flow rate of the streams is between about 100 mL/min to about 1 L/min.

\* \* \* \* \*